United States Patent [19]

Kobayashi et al.

[11] Patent Number: 4,695,074
[45] Date of Patent: Sep. 22, 1987

[54] VEHICLE SUSPENSION APPARATUS

[75] Inventors: Kazuyoshi Kobayashi, Oobu; Shozo Takizawa, Okazaki; Tadao Tanaka, Okazaki; Mitsuhiko Harara, Okazaki; Yasutaka Taniguchi; Masanaga Suzumura, both of Nagoya; Minoru Tatemoto, Okazaki; Naotake Kumagai, Aichi, all of Japan

[73] Assignee: Mitsubishi Jidosha Kogyo Kabushiki Kaisha, Tokyo, Japan

[21] Appl. No.: 747,651

[22] Filed: Jun. 21, 1985

[30] Foreign Application Priority Data

Jun. 30, 1984 [JP] Japan ............................ 59-98981[U]
Jul. 25, 1984 [JP] Japan ............................ 59-112664[U]
Nov. 30, 1984 [JP] Japan ............................ 59-182008[U]

[51] Int. Cl.⁴ ............................................ B60G 11/26
[52] U.S. Cl. .............................. 280/707; 280/DIG. 1
[58] Field of Search ............... 280/707, DIG. 1, 703, 280/6.1, 6 H

[56] References Cited

U.S. PATENT DOCUMENTS

| 2,921,160 | 1/1960 | Lautzenhiser | 280/707 |
| 2,950,124 | 8/1960 | Pribonic | 280/707 |
| 3,659,870 | 5/1972 | Okuyama | 280/6 H |
| 3,736,003 | 5/1973 | Ono | 267/65 D |
| 4,345,661 | 8/1982 | Nishikawa | 280/6 H |

FOREIGN PATENT DOCUMENTS

| 659209 | 3/1963 | Canada | 280/6.1 |
| 1170572 | 11/1969 | United Kingdom . | |
| 2091174 | 7/1982 | United Kingdom . | |
| 1384454 | 2/1975 | United Kingdom . | |
| 2051302A | 1/1981 | United Kingdom . | |

Primary Examiner—John J. Love
Assistant Examiner—Ross Weaver
Attorney, Agent, or Firm—Frishauf, Holtz, Goodman & Woodward

[57] ABSTRACT

In a vehicle suspension apparatus having air spring chambers between the vehicle body and the respective wheels to perform height and position control modes by controlling supply control valve means for supplying air to the air spring chambers and exhaust control valve means for exhausting air from the air spring chambers, the vehicle suspension apparatus has a high-pressure reserve tank connected to the respective chambers through the supply control valves, a first compressor for supplying compressed air to the high-pressure reserve tank, a low-pressure reserve tank connected to the respective chambers through the corresponding exhaust control valves and the suction port of the first compressor, and a second compressor for supplying atmospheric air to the high-pressure reserve tank through a check valve and a drier arranged between the check valve and the second compressor. In the position control mode, the compressed air is exhausted from the chambers to the low-pressure reserve tank through the exhaust control valves. In the height control mode, the compressed air is slowly exhausted from the corresponding chambers through the exhaust control valve means via the drier, thereby regenerating the drier during height down control.

17 Claims, 8 Drawing Figures

VEHICLE SUSPENSION APPARATUS

BACKGROUND OF THE INVENTION

The present invention relates to a vehicle suspension apparatus having air spring chambers between the vehicle body and the respective wheels, which air spring chambers compressed air can be either supplied or exhausted.

In a conventional suspension apparatus of this type, compressed air supplied to the respective air spring chambers is obtained by compressing atmospheric air by an air compressor. The compressed air exhausted from the air spring chambers is returned to the atomsphere. When atomspheric air is taken in, it must be dried by a drier with silica gel or the like in order to protect metal parts of an air circuit from rust and to prevent valves from becoming inoperative due to freezing of moisture. With such a conventional arrangement, the drier absorbs moisture from the air while drying it, so that its moisture absorbing capacity is degraded. In the worst case, the drier must be replaced several times, resulting in inconvenience.

SUMMARY OF THE INVENTION

It is an object of the present invention to provide a vehicle suspension apparatus having air spring chambers between a vehicle body and the respective wheels so as to optimally eliminate the above-mentioned inconveniences.

In order to achieve the above object of the present invention, there is provided a vehicle suspension apparatus comprising air spring chambers arranged between a vehicle body and respective wheels, air supply means for supplying air to the air spring chambers through corresponding supply control valves, air exhaust means for exhausting the air from the air spring chambers through corresponding exhaust control valves, and control means for controlling the supply and exhaust control valves, wherein the air supply means comprises a high-pressure reserve tank, connected to the air spring chambers through the supply control valves, and a compressor for supplying compressed air to the high-pressure reserve tank, and wherein the air exhaust means comprises a low-pressure reserve tank, connected to the air spring chambers through the exhaust control valves, the compressor being provided with a suction port connected to the low-pressure reserve tank.

DETAILED DESCRIPTION OF THE PREFERRED EMBODIMENTS

Figure 1:
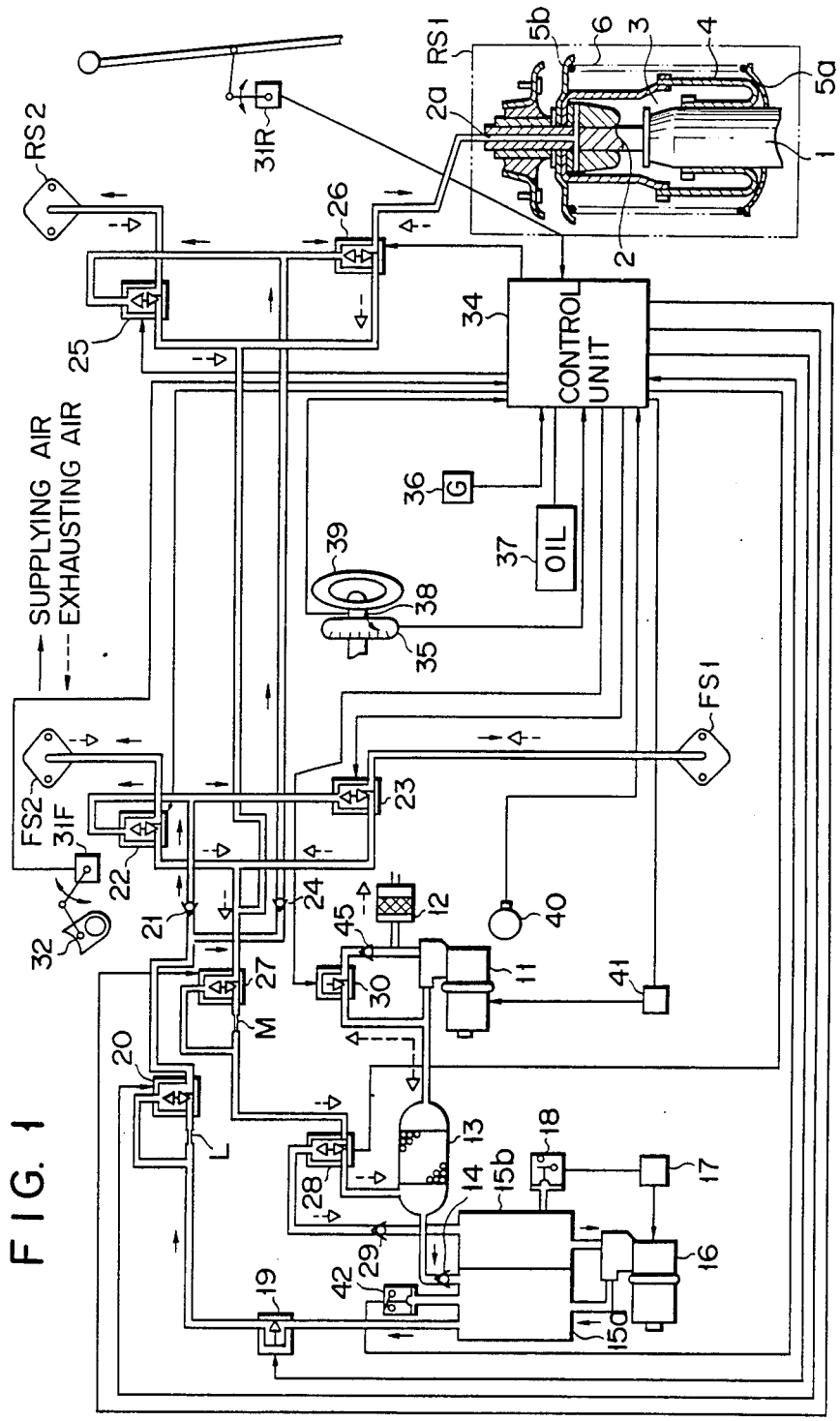
FIG. 1 s a diagram showing a first embodiment of the present invention.
Figure 2A:
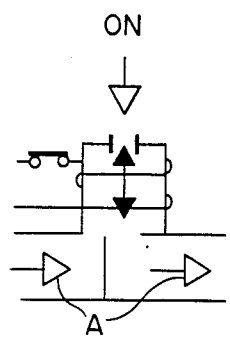
FIGS. 2A and 2B are diagrams showing ON and OFF states of solenoid valves 20, 22, 23, 25, 26, 27 and 28 in the first embodiment, respectively.
Figure 2B:
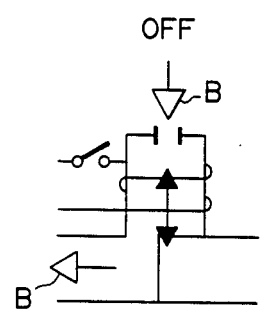
Figure 3A:
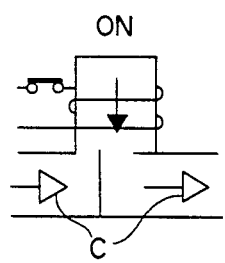
FIGS. 3A and 3B are diagrams showing ON and OFF states of supply and exhaust valves 19 and 30 in the first embodiment, respectively.
Figure 3B:
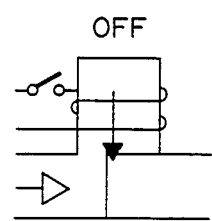

FIGS. 1 to 3 show a vehicle suspension apparatus according to a first embodiment of the present invention.

Referring to FIG. 1, reference symbol FS1 denotes a front left wheel suspension unit; FS2, a front right wheel suspension unit; RS1, a rear left wheel suspension unit, and RS2, a rear right wheel suspension unit. The units FS1, FS2, RS1 and RS2 have identical structures, so that the suspension units are represented by reference symbol S except for the cases wherein the front wheel suspension units must be distinguished from the rear wheel suspension units, or the left wheel suspension units must be distinguished from the right wheel suspension units.

The unit S comprises a strut type shock absorber 1. The absorber 1 has a cylinder mounted on the vehicle body, a piston slidably fitted in the cylinder, and a piston rod 2 whose upper end is supported by the vehicle body. The unit S has an air spring chamber 3 at an upper portion of the absorber 1. The chamber 3 is coaxial with the piston rod 2. Part of the chamber 3 is constituted by a bellows 4. Air is supplied to or exhausted from the chamber 3 through a path $2a$ formed in the piston rod 2, thereby controlling the vehicle height.

A spring retainer $5a$ is formed on the outer surface of the cylinder of the absorber 1 to extend upward. A spring retainer $5b$ is formed on the outer surface of the piston rod 2 to extend downward. A coiled spring 6 is compressed between the spring retainers $5a$ and $5b$. The spring 6 supports part of the vehicle weight.

Reference numeral 11 denotes a compressor as a second compressor. The compressor 11 receives air from an air cleaner 12 and compresses it. The compressed air is supplied to a high-pressure reserve tank $15a$ through a drier 13 and a check valve 14. More particularly, the compressor 11 compresses the atmospheric air supplied from the cleaner 12 and supplies the compressed air to the drier 13. Therefore, the compressed air, dried with silica gel or the like, is reserved in the tank $15a$. Reference numeral 16 denotes a compressor as a first compressor. The suction port of the compressor 16 is connected to a low-pressure reserve tank $15b$, and a delivery port of the compressor 16 is connected to the tank $15a$. Reference numeral 18 denotes a pressure switch which is turned on when the pressure in the tank $15b$ exceeds a first predetermined value (e.g., the atmospheric pressure). The compressor 16 is driven by a compressor relay 17 which is turned on in response to an ON signal from the switch 18, thereby maintaining the pressure of the tank $15b$ below the first predetermined value.

Compressed air is supplied from the tank $15a$ to the units S in a direction indicated by solid arrows in FIG. 1. More specifically, the compressed air in the tank $15a$ is supplied to the units FS1 and FS2 through an air supply solenoid valve 19, a supply flow control valve 20 of a three-directional valve (to be described later), a check valve 21, a front right solenoid valve 22 and a front left solenoid valve 23. Similarly, compressed air in the tank $15a$ is supplied to the units RS1 and RS2 through the valves 19 and 20, a check valve 24, a rear right solenoid valve 25 and a rear left solenoid valve 26. The valve 20 is switched between a first position (i.e., an ON state) where the compressed air flows through a small-diameter path L, and a second position (i.e., an OFF state) where the compressed air flows through a large-diameter path.

The air is exhausted from the units S in the direction indicated by broken arrows in FIG. 1. More particularly, the compressed air is exhausted from the units FS1 and FS2 to the tank 15b through the valve 22, the valve 23, an exhaust flow control valve 27 and an exhaust direction selector valve 28 of a three-directional valve, or into the atmospheric air through the valves 22, 23, 27 and 28, the drier 13, an exhaust solenoid valve 30 and the cleaner 12. Similarly, the compressed air in the units RS1 and RS2 is exhausted to the tank 15b through the valves 25, 26, 27 and 28, or into the atmospheric air through the valves 25, 26, 27 and 28, the drier 13, the valve 30, a check valve 45 and the cleaner 12. The valve 27 is switched between a first position (i.e., an ON state) where the compressed air is exhausted from the unit S through a small-diameter path M, and a second position (i.e., an OFF state) where the compressed air is exhausted through a large-diameter path.

The valves 20, 22, 23, 25, 26, 27 and 28 allow an air flow in the direction indicated by arrow A of FIG. 2A when they are turned on (energized), and an air flow in the direction indicated by arrow B of FIG. 2B when they are turned off (deenergized). The valves 19 and 30 allow an air flow in the direction indicated by arrow C of FIG. 3A when they are turned on (energized), but do not allow the air flow therethrough when they are turned off (deenergized).

The valves 29 and 45 serve as one-directional valves and are also arranged to be opened when a pressure difference between the upstream and downstream air components exceeds a predetermined value. Therefore, the pressure of the upstream air (i.e., the side near the valve 28 with respect to these check valves) cannot be decreased below the predetermined value.

Reference numeral 31F denotes a front height sensor arranged between a front right wheel suspension lower arm 32 and the vehicle body to detect a front vehicle height, while 31R, denotes a rear height sensor arranged between a rear left suspension lateral rod and the vehicle body to detect a rear vehicle height. Signals detected by the sensors 31F and 31R are supplied to a control unit 34 incorporating a microcomputer. Each of the sensors 31F and 31R comprises a Hall IC element and a magnet, one of which is mounted on the wheel, and the other one of which is mounted on the vehicle body. The sensors 31F and 31R detect a difference between the current height and a normal height level, a low height level or a high height level. The height sensor may comprise another sensor using, for example, a phototransistor.

Reference numeral 35 denotes a vehicle velocity sensor incorporated in a speedometer. A velocity signal detected by the sensor 35 is supplied to the unit 34.

Reference numeral 36 denotes an acceleration (G) sensor for detecting an acceleration acting on the vehicle body. The sensor 36 detects pitching, rolling and yaw accelerations of the vehicle body, i.e., an sprung mass. When no acceleration acts on the body, the weight is vertically suspended to cause a light-shielding plate, interlocked with the weight, to shield light from a light emitting diode so that light from the light emitting diode cannot reach a photodiode, thereby detecting that no acceleration acts on the body. However, when an acceleration acts on the body, the weight is so inclined as to allow light from the light emitting diode to be transmitted to the photodiode. A signal from the sensor 36 is then supplied to the unit 34.

Reference numeral 37 denotes an indicator (OIL) for indicating a hydraulic pressure of an engine (not shown); 38, a steering sensor for detecting a steering angle, i.e., a rotational angle of a steering wheel 39; and 40, an accelerator depression angle sensor for detecting a depression angle of an accelerator pedal. Signals detected from the sensors 38 and 40 are supplied to the unit 34.

Reference numeral 41 denotes the compressor relay for driving the compressor 11. The relay 41 is controlled by a control signal from the unit 34. Reference numeral 42 denotes a pressure switch which is turned on when a pressure of the tank 15a is decreased below a second predetermined value (e.g., 7 kg/cm$^2$). A signal from the switch 42 is supplied to the unit 34. When the pressure of the tank 15a is decreased below the corresponding predetermined value and the switch 42 is turned on, the unit 34 supplies a drive signal to the relay 41 which then drives the compressor 11. Therefore, the pressure of the tank 15a is always kept at the corresponding predetermined value or more.

The valves 19, 20, 22, 23, 25, 26, 27, 28, 29 and 30 are controlled in response to control signals from the unit 34.

The operation of the vehicle suspension apparatus according to the first embodiment having the structure described above will be described.

The apparatus has height and position control functions.

The height control function will be first described. The unit 34 reads the outputs from the sensors 31F and 31R. The heights detected by the sensors 31F and 31R are compared by the unit 34 with target heights. The unit 34 supplies control signals to the corresponding solenoid valves such that the detected heights are equal with the target heights. The respective valves are closed during normal straight line driving. In this state, neither air supply nor air exhaustion is performed, and the air spring chambers of the right suspension units communicate with those of the left suspension units, maintaining an identical pressure.

The height control mode will be described in detail hereinafter.

When the heights detected by the sensors 31F and 31R are lower than the target heights, the unit 34 supplies the control signal to the valve 19 which is turned on and set in the state of FIG. 3A. At the same time, the valve 20 is turned on and set in the state of FIG. 2A. Since the valves 22, 23, 24 and 25 are not turned on, they are kept in the state of FIG. 2B. For this reason, the compressed air is supplied from the tank 15a to the chambers 3 of the units FS1 and FS2 through the valve 19, the path L, the valves 20 and 21 and the valve 22 or 23. At the same time, the compressed air is supplied from the tank 15a to the chambers 3 of the units RS1 and RS2 through the valve 19, the path L, the valves 20 and 24, and the valve 25 or 26. Therefore, the front and rear heights are increased. When the heights detected by the sensors 31F and 31R coincide with the target heights, respectively, the valve 19 is closed in response to the control signal supplied from the unit 34, thereby completing height control.

However, when the heights detected by the sensors 31F and 31R are higher than the target heights, the unit 34 supplies the control signals to the valves 22, 23, 25, 26, 27 and 28 which are then set in the state of FIG. 2A.

At the same time, the valve 30 is turned on and set in the state of FIG. 3A. For this reason, part of the compressed air is exhausted from the chambers 3 of the units FS1, FS2, RS1 and RS2 into the air through the valves 22, 23, 25 and 26, the path M, the valve 28, the drier 13, the valves 30 and 45 and the cleaner 12, so that the actual front and rear heights are decreased. When the actual heights coincide with the target heights, the valves 22, 23, 25, 26, 27, 28 and 30 are closed in response to the control signals from the unit 34, thereby completing height control.

The position control function will be described wherein the steering wheel 39 is turned to the right (clockwise) or left (counterclockwise).

When a driver turns the steering wheel 39 to the right, the vehicle body tends to roll to the left. The unit 34 causes the valve 19 to turn on for a predetermined period of time. At the same time, the valves 22 and 25 are turned on. When the predetermined period of time has elapsed, the valve 28 is turned on. Therefore, the compressed air is supplied from the tank 15a to the chambers 3 of the units FS1 and RS1 in a predetermined volume, and, simultaneously, the compressed air is exhausted from the chambers 3 of the FS2 and RS2 to the tank 15b in a predetermined volume. This state, i.e., a state wherein the compressed air is supplied to the chambers 3 of the units FS1 and RS1 in a predetermined volume and the compressed air is exhausted from the chambers 3 of the units FS2 and RS2 in a predetermined volume, can be maintained indefinitely. When turning is ended and straight line driving is resumed, started, the unit 34 detects, in response to the output from the sensor 38, that the steering position is set in the neutral position. The unit 34 causes the valves 22 and 25 to turn off. At the same time, the valve 28 is turned off. Therefore, the left air spring chambers are kept at the same pressure as that of the right air spring chambers. In other words, the state prior to position control is restored.

When the driver turns the steering wheel 39 to the left, the vehicle body tends to roll to the right. The unit 34 causes the valve 19 to turn on for a predetermined period of time. At the same time, the left wheel valves 23 and 26 are turned on. When the predetermined period of time has elapsed, the valve 28 is turned on. The compressed air is supplied from the tank 15a to the chambers 3 of the units FS2 and RS2 in a predetermined volume. At the same time, the compressed air is exhausted from the chambers 3 of the units FS1 and RS1 to the tank 15b in a predetermined volume. As a result, a displacement, representing rolling of the vehicle body to the left, is restricted. Subsequently, the same control operation as in the case wherein the steering wheel 39 is turned to the right, is performed.

A nose dive position control mode will be described wherein the driver depresses a brake pedal to apply a negative acceleration on the vehicle body. When the driver depresses the brake pedal and a negative acceleration along a front to rear direction of the vehicle body exceeds a predetermined value, and is detected by the sensor 36, the unit 34 causes the valve 19 to turn on for a predetermined period of time. At the same time, the valves 25 and 26 are opened. When the predetermined period of time has elapsed, the valve 28 is turned on. The compressed air is supplied from the tank 15a to the units FS1 and FS2 in a predetermined volume, and, simultaneously, the compressed air is exhausted from the units RS1 and RS2 to the tank 15b, thereby controlling nose dive. This state is maintained until the negative acceleration is decreased. When the sensor 36 detects that the negative acceleration is decreased below the predetermined value, the unit 34 causes the valves 19, 22 and 23 to turn on for a predetermined period of time, and, at the same time, the valves 25 and 26 are turned off. The compressed air is exhausted from the units FS1 and FS2 to the tank 15b in a predetermined volume, while conversely, the compressed air is supplied to the units RS1 and RS2 in a predetermined volume, thereby restoring the state of the air spring chambers of the units S to that prior to the nose dive control mode.

A squat position control mode will be described wherein the driver rapidly depresses the accelerator pedal causing the front portion of the vehicle body to move upward and the rear portion to move downward. When a rapid acceleration is detected by the sensor 40 or 36, the unit 34 causes the valve 19 to open for a predetermined period of time, and, at the same time, the valves 22 and 23 are turned on. When the predetermined period of time has elapsed, the valve 28 is turned on. The compressed air is exhausted from the front units FS1 and FS2 in a predetermined volume, and, simultaneously, the compressed air is supplied from the tank 15a to the rear units RS1 and RS2 in a predetermined volume, thereby controlling squat. This state is maintained until the acceleration is decreased below the predetermined value. Thereafter, when the unit 34 detects, in response to an output from the sensors 40 or 36, that the rapid acceleration has decreased below the predetermined value, the unit 34 causes the valves 19, 25 and 26 to open for a predetermined period of time, while, at the same time, the valves 22 and 23 are turned off. The compressed air is supplied from the tank 15a to the front units FS1 and FS2 in a predetermined volume, and, simultaneously, the compressed air is exhausted from the rear units RS1 and RS2 to the tank 15b. The pressure of the air spring chambers of the units S restore the state prior to squat control.

The compressor 16, as the first compressor, is driven in response to a signal from the pressure switch 18 when the pressure in the tank 15b exceeds the first predetermined value. The compressor 11, as the second compressor, is driven in response to a signal from the switch 42 when the pressure in the tank 15a is decreased below the second predetermined value. When the above-mentioned position control modes are performed, the compressed air is supplied to the contracted chambers 3 and, simultaneously, exhausted from the extended chambers 3. Therefore, a decrease in pressure of the tank 15a occurs simultaneously with an increase in pressure of the tank 15b. The first and second predetermined values which determine the drive timings of the compressors 16 and 11, and the capacities of the tanks 15a and 15b are determined such that the increase in pressure of the tank 15a occurs prior to the decrease in the second predetermined value if each position control is set.

With the above arrangement, only the compressor 16 is driven in position control to prevent atmospheric air from being taken in. Even if the compressed air is supplied to the contracted air spring chambers and exhausted from the extended air spring chambers in a predetermined volume, the state prior to position control can be restored at the end of position control, and external air need not be taken in.

However, when height up control is performed, only the pressure in the tank 15a is decreased. When the pressure in the tank 15a is decreased below the second predetermined value upon height control, the compressor 11 is driven to receive external air. This is because the amount of air in the tank is substantially decreased when the pressure of each air spring chamber is increased in the height control mode.

As is apparent from the first embodiment, when position control is performed, atmospheric air need not be received from the cleaner 12, and the lifetime of the drier 13 will not be shortened even if position control is frequently performed.

When the height down control is to be performed, the compressed air is exhausted from the respective air spring chambers 3 into the atmospheric air through the valve 27, the path M, the valve 28, the drier 13, the valves 30 and 45 and the cleaner 12. Therefore, during the height down control mode, the dried air exhausted from the chambers 3 slowly passes through the drier 13, thereby regenerating the drier 13.

The valve 45 is arranged midway along the exhaust path so as to control the height down operation. Even if valve 22, 23, 25 or 26 is turned on, and the valve 30 is kept on, the pressure in each chamber 3 is maintained by the valve 45 above the predetermined value. The bellows 4 of each air spring chamber 3 will not be clamped between other parts or damaged.

Similarly, the valve 29 is arranged midway along the exhaust path for position control. When valve 22, 23, 25 or 26 is kept on during position control for some reason, the pressure in the chamber 3 is kept by the valve 29 at or above the predetermined value. As a result, the bellows 4 of each chamber will not be clamped between other parts or damaged.

In the first embodiment, when the switch 18 detects that the tank 15b has a pressure higher than the first predetermined value as the atmospheric pressure, the compressor 16 is driven through the relay 17. However, for example, when the switch 18 detects that the pressure of the tank 15b is 2 kg/cm$^2$ or more, the compressor 16 can be driven through the relay 17.

In the first embodiment, a damping force switching mechanism and/or a spring force switching mechanism can be provided for each unit S. When high-speed or position control is performed, the above-mentioned mechanism can increase the damping force and/or spring force of each unit S.

A vehicle suspension apparatus, according to a second embodiment of the present invention, will be described with reference to FIG. 4.

Figure 4:
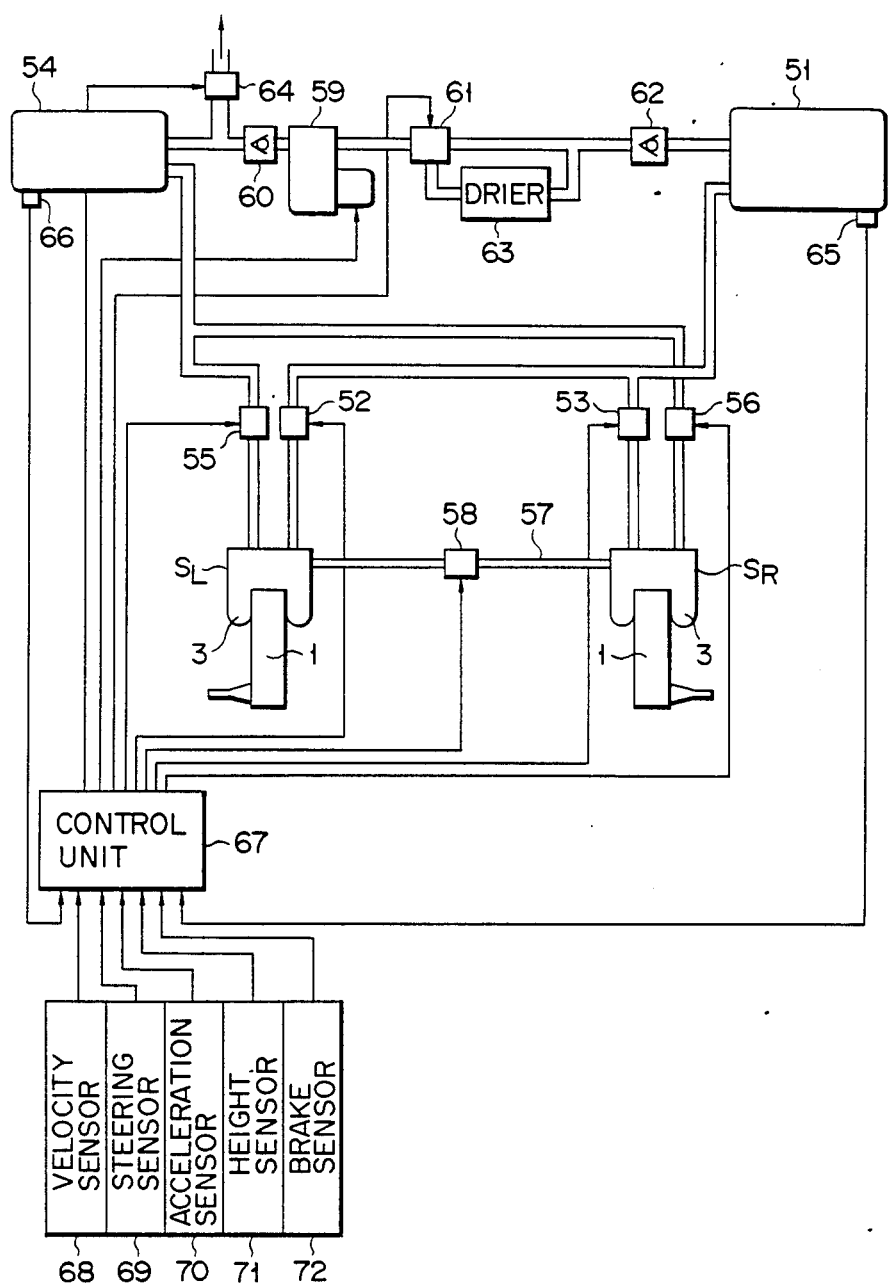
FIG. 4 is a diagram showing a second embodiment of the present invention.

Referring to FIG. 4, reference symbol SL denotes a left wheel suspension unit, and SR, a right wheel suspension unit. Each suspension unit has a shock absorber 1 and an air spring chamber 3, in the same manner as in the first embodiment. Reference numeral 51 denotes a high-pressure reserve tank for supplying air to the chambers 3 of the units SL and SR through air supply valves 52 and 53, respectively. Reference numeral 54 denotes a low-pressure reserve tank which receives the compressed air exhausted from the chambers 3 of the units SL and SR through respective exhaust valves 55 and 56. Reference numeral 57 denotes a communication path for causing the left wheel chamber 3 to communicate with the right wheel chamber 3 through a communication control valve 58.

Reference numeral 59 denotes a compressor, a suction port of which is connected to the tank 54, and a delivery port of which is connected to the tank 51. A check valve 60 is arranged between the compressor 59 and the tank 54 to allow an air flow only from the tank 54 to the compressor 59. A selector valve 61 and a check valve 62, for allowing an air flow from the valve 61 to the tank 51, are inserted between the compressor 59 and the tank 51. The valve 61 is switched between a first position where the compressed air passing through the valve 61 is directly supplied to the valve 62, and a second position where the compressed air flowing through the valve 61 is supplied to the valve 62 through a drier 63.

Reference numeral 64 denotes an air open valve arranged between the tank 54 and the valve 60 to set a portion between the tank 54 and the valve 60 at the atmospheric pressure.

Reference numeral 65 denotes a pressure sensor for detecting a pressure of the tank 51, while 66 denotes a pressure sensor for detecting a pressure of the tank 54. Detection signals from the sensors 65 and 66 are supplied to a control unit 67 incorporating a microcomputer.

Reference numeral 68 denotes a vehicle velocity sensor for detecting a velocity of the vehicle; 69, a steering sensor for detecting a steering state of a steering wheel (not shown); 70, an acceleration sensor for detecting an acceleration acting on the vehicle body; 71, a height sensor for detecting a height of the vehicle; and 72, a brake sensor for detecting an operating state of the brake mechanism. Detection signals from the sensors 68 to 72 are supplied to the unit 67.

The valves 52, 53, 55, 56, 61 and 64, respectively, comprise solenoid valves which are controlled in response to control signals from the unit 67.

The operation of the vehicle suspension apparatus, having the arrangement described above, will be described hereinafter.

The height control function will be first described. The unit 67 reads the output from the sensor 71. The height detected by the sensor 71 is compared by the unit 71 with the target height stored therein. The unit 67 supplies control signals to the corresponding valves such that the detected height is equal with the target height. In normal straight line driving, the respective valves are turned off, and neither air supply nor air exhaustion is performed. The right air spring chambers communicate with the left air spring chambers to maintain the same pressure.

Height control modes will be described in detail. For example, when a height detected by the sensor 71 is lower than the target height, the unit 67 supplies the control signals to the valves 52 and 53 which are then opened. The compressed air is supplied from the tank 51 to the chambers 3 to increase the vehicle height. When the height detected by the sensor 71 coincides with the target sensor, the valves 52 and 53 are closed in response to the control signals from the unit 67, thereby stopping height control.

However, when the height detected by the height sensor 71 is higher than the target height, the valves 55 and 56 are opened in response to the signals from the unit 67. The compressed air is exhausted from the chambers 3 to the tank 54, so that the height is decreased. When the height detected by the sensor 71 coincides with the target height, the valves 52 and 53 are closed in response to the control signals from the unit 67, thereby stopping height control.

The position control function will be described wherein the steering wheel is turned to the right (clockwise) or left (counterclockwise). When the driver turns the steering wheel to the right, the vehicle body tends to roll to the left. The control unit 67 supplies a control signal to the valve 58 which is then closed. At the same time, the unit 67 supplies the control signals to the valves 52 and 56 which are then opened for a predetermined period of time. The compressed air is supplied to the left chambers 3 in a predetermined volume, and the compressed air is exhausted from the right chambers 3 in a predetermined volume, thereby controlling a rolling displacement of the body. This state, i.e., a state wherein the compressed air is supplied to the left chambers 3 in the predetermined volume and exhausted from the right chambers 3 in the predetermined volume, is maintained. When turning is ended and straight driving is started, i.e., when the unit 67 detects, in response to the output from the sensor 69, that the steering wheel is set in the neutral position, the unit 67 supplies a control signal to open the valve 58. The spring chambers 3 of the left and right suspension units are kept at the same pressure.

When the driver turns the steering wheel to the left, however, the vehicle body tends to roll to the right. The unit 67 supplies the control signal to the valve 58 which is then closed. At the same time, the valves 53 and 55 are opened for a predetermined period of time. The compressed air is supplied to the right chambers 3 in a predetermined volume, and, at the same time, the compressed air is exhausted from the left chambers 3, thereby controlling the rolling displacement of the vehicle body. This state, i.e., a state wherein the compressed air is supplied to the right chambers 3 and exhausted from the left chambers 3 in the predetermined volume, is maintained. Thereafter, when turning is ended and straight driving is resumed, i.e., when the unit 67 detects, in response to a signal from the sensor 69, that the steering wheel has returned to the neutral position, the unit 67 supplies the control signal to the valve 58 which is then opened. The pressure of the right chambers 3 becomes the same as that of the left chambers 3.

When the unit 67 causes the sensor 65 to detect that the internal pressure of the tank 51 is decreased below the predetermined value, the unit 67 supplies a control signal to the compressor 59 which is then driven.

The unit 67 causes the sensor 66 to detect when the internal pressure of the tank 54 exceeds the atmospheric pressure, and the valve 64 is then opened. However, when the internal pressure is less than the atmospheric pressure, the valve 64 is closed. When the compressor 59 is driven while the valve 64 is open, the unit 67 supplies a control signal to the valve 61 to cause the compressed air from the compressor 59 to pass through the drier 63.

According to the second embodiment described above, atmospheric air need not be taken in when the height or position control mode is set. Even if such modes are frequently performed, the life time of the drier 63 will not be shortened.

The internal pressure of the tank 54 will not be increased above the atmospheric pressure. When the compressed air is exhausted from the chambers 3 through the valve 53 or 55, air exhaustion efficiency will not be degraded.

In a state wherein the compressor 59 is driven, and the valve 64 is opened, all the compressed air exhausted from the compressor passes through the drier 63, and moisture in the air circuit will not be increased.

Figure 5:
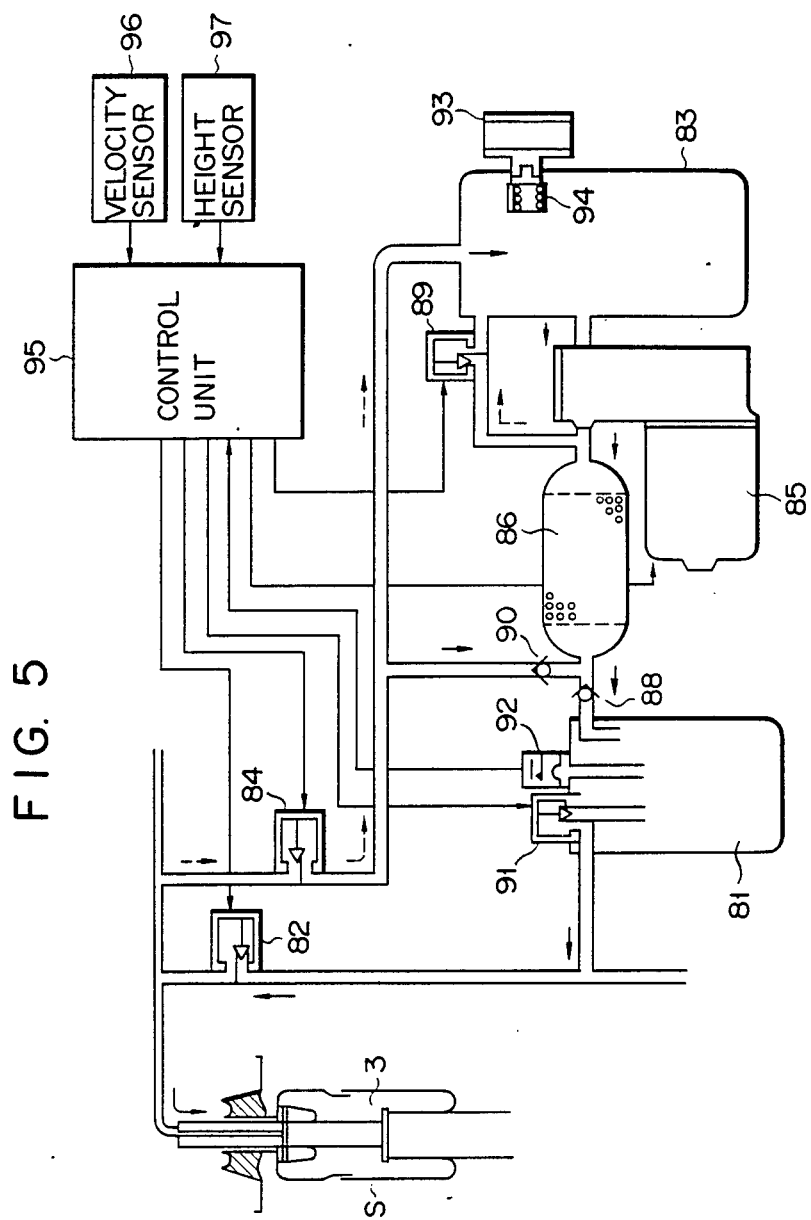
FIG. 5 is a diagram showing a third embodiment of the present invention.

A vehicle suspension apparatus, according to a third embodiment of the present invention, will be described with reference to FIG. 5.

Reference numeral S denotes a suspension unit having the same air spring chamber 3 as in the first embodiment. The units S are mounted on the wheels, respectively, but only one unit is illustrated in FIG. 5. Reference numeral 81 denotes a high-pressure reserve tank; 82, an air supply control valve arranged between the tank 81 and each unit S; 83, a low-pressure reserve tank; and 84, an exhaust control valve arranged between the tank 83 and each unit S.

Reference numeral 85 denotes a compressor, a suction port of which is connected to the tank 83, and a delivery port of which is connected to the tank 81 through a drier 86 and a check valve 88.

Reference numeral 89 denotes a normally closed valve arranged between the drier 86 and the tank 83 to select an exhaust path. Reference numeral 90 denotes a check valve arranged between the valve 84 and the drier 86 to allow an air flow from the valve 84 to the drier 86.

Reference numeral 91 denotes a valve arranged between the tank 81 and the valve 82. Reference numeral 92 denotes a pressure switch which is turned on when the pressure of the tank 81 is less than a predetermined pressure.

Reference numeral 93 denotes an air cleaner connected to the tank 83 through a check valve 94. When the pressure of the tank 83 is decreased, the valve 94 is opened to supply atmospheric pressure in the tank 83.

The valves 82, 84, 89 and 91, respectively, comprise solenoid valves which are controlled in response to control signals from a control unit 95.

Reference numeral 96 denotes a vehicle velocity sensor, while 97 denotes a height sensor. Outputs from the sensors 96 and 97 are supplied to the unit 95.

The unit 95 reads the detection signal from the sensor 97. The valve 82 or 84 is opened so that the detected height is changed to coincide with the target height. Thereafter, when the detected height coincides with the target height, the opened valve is closed.

The unit 95 also reads a signal from the pressure switch 92. When the switch 92 is turned on, the unit 95 supplies a control signal to drive the compressor 85.

The unit 95 supplies a control signal to the valve 84 which is then opened so as to perform height down control. When the compressor 85 is not driven, the valve 89 is opened.

Figure 6:
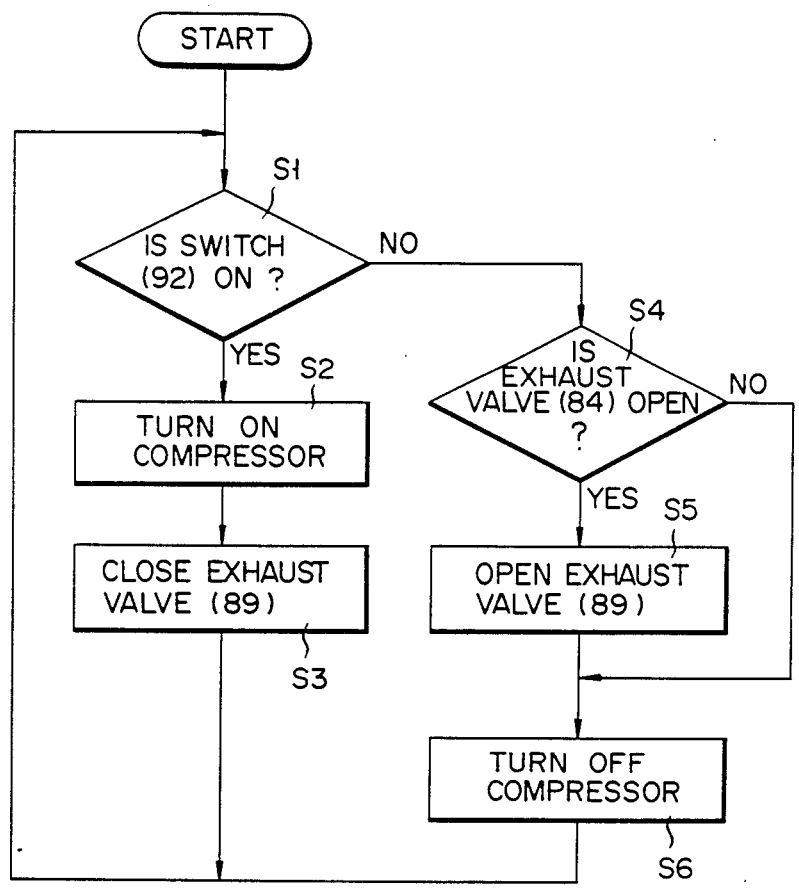
FIG. 6 s a flow chart for explaining the control operation of a compressor 85 and a control valve 89 according to the third embodiment of the present invention.

The mode of operation of the unit 95 will be described with reference to a flow chart of FIG. 6, so as to explain control for the compressor 85 and the valve 89.

According to the third embodiment, when passengers ride in the vehicle and the height is decreased, the unit 95 supplies a control signal to open the valve 82, supplying compressed air to the chambers 3 to thereby increase the height. When the pressure of the tank 81 is decreased below the predetermined value and the switch 92 is turned on, the unit 95 drives the compressor 85. The air from the tank 83 is dried by the drier 86, and the dried air is reserved in the tank 81. In this case, when the pressure of the tank 83 is decreased below the atmospheric pressure, the valve 94 is opened to supply the air from the cleaner 93 to the tank 83. However, when the pressure of the tank 83 is higher than the atmospheric pressure, the valve 94 will not be opened.

Accordingly, once the maximum quantity of air required for the chambers 3 is reserved in the tank 83 through the valve 94, the valve 94 will not be opened, thereby decreasing the load of the drier 86. The lifetime of the drier 86 can thus be greatly prolonged.

When the height down control is performed and the compressor 85 is not driven, the valve 89 is opened by the unit 95. The chambers 3 are evacuated and part of the air passing through the valve 84 passes through the drier 86. Therefore, dried air passes through the drier 86 and the drier 86 is regenerated. When the drier 86 is regenerated, moisture in the tank 83 is increased to a degree corresponding to the air used for regeneration of the drier. In so much as such moisture is reserved in the tank 83, adverse effects that might otherwise occur, are prevented.

What is claimed is:

1. A vehicle suspension apparatus comprising:
    air spring chambers arranged between a vehicle body and respective wheels, said air chambers comprising left air chambers and right air chambers:
    air supply means for supplying air to said air spring chambers through supply control valve means;
    air exhaust for exhausting the air from said air spring chambers through exhaust control valve means;
    control means for controlling said supply and exhaust control valve means;
    said air supply means comprising a high-pressure reserve tank connected to said air spring chambers through said supply control valve means and a first compressor for supplying compressed air to said high-pressure reserve tank;
    said air exhaust means comprising a low-pressure reserve tank connected to said air spring chambers through said exhaust control valve means;
    said first compressor of said air supply means being provided with a suction port connected to said low-pressure reserve tank;
    position change detecting means for detecting a position change in the vehicle body;
    position control means for supplying a position control signal to said supply and exhaust control valve means so as to control the position change such that the air is supplied to contracted air spring chambers, among said air spring chambers, along a direction of the positon change in a predetermined volume, and such that the air is exhausted from extended air spring chambers, among said air spring chambers, in a predetermined volume when said position change detecting means detects a position change signal;
    communicating means for causing left air spring chambers to communicate with right air spring chambers, among said air spring chambers, through a communication control valve; and
    said position control means including means for generating, in a normal vehicle position state, a communication control valve control signal to open said communication control valve so as to cause said left air spring chambers to communicate with said right air spring chambers; for generating a communication control signal to close said communication control valve when said position change detecting means detects the position change signal, and, at the same time, supplying a control signal to said supply and exhaust control valves so as to control the position change such that the air is supplied to contracted air spring chambers, among said air spring chambers, along a direction of the position change in a predetermined volume, and exhausted from extended air spring chambers, among said air spring chambers, in a predetermined volume, as well as supplying a control signal to said communication control valve to open said communication control valve when the position change of the vehicle body is detected, by said position change detecting means, to be decreased below a predetermined level after the control signal for controlling the position change is generated.

2. The apparatus of claim 1, further comprising height detecting means for detecting a height of the vehicle; and height control means for supplying a height control signal to said supply and exhaust control valve means so as to control the vehicle height such that the air is supplied to or exhausted from said air spring chambers on the basis of a height signal detected by said height detecting means.

3. The appartus of claim 1, further comprising compressor control means for driving said first compressor when the pressure of said low-pressure reserve tank exceeds a predetermined pressure.

4. The apparatus of claim 1, further comprising compressor control means for driving said first compressor when the pressure of said high-pressure reserve tank is less than a predetermined pressure.

5. The apparatus of claim 1, further comprising an atmospheric air control valve connected to said suction port of said first compressor for switching between a first position where atmospheric air is supplied to said first compressor, and a second position where atmospheric air is not supplied to said first compressor.

6. The apparatus of claim 1, further comprising an atmospheric air check valve connected to said suction port of said first compressor, for communicating with atmospheric air when a pressure at a connecting portion between said check valve and said suction is less than the atmospheric pressure.

7. The apparatus of claim 6, wherein said check valve is arranged in said low-pressure reserve tank.

8. A vehicle suspension apparatus comprising:
    air spring chambers arranged between a vehicle body and respective wheels;
    air supply means for supplying air to said air spring chambers through supply control valve means;
    air exhaust means for exhausting the air from said air spring chambers through exhaust control valve means;
    control means for controlling said supply and exhaust control valve means;
    said air supply means comprising a high-pressure reserve tank connected to said air spring chambers through said supply control valve means and a first compressor for supplying compressed air to said high-pressure reserve tank;
    said air exhaust means comprising a low-pressure reserve tank connected to said air spring chambers through said exhaust control valve means;
    said first compressor of said air supply means being provided with a suction port connnected to said low-pressure reserve tank;
    height detecting means for detecting a height of the vehicle;
    height control means for supplying a height control signal to said supply and exhaust control valve means so as to control the vehicle height such that the air is supplied to or exhausted from said air spring chambers on the basis of a height signal detected by said height detecting means;
    position change detecting means for detecting a position change in the vehicle body; and position control means for supplying a position control signal to said supply and exhaust control valve means so as to control the position change such that the air is supplied to contracted air spring chambers, among said air spring chambers, along a direction of the position change in a predetermined volume, and such that the air is exhausted from extended air spring chambers, among said air spring chambers, in a predetermined volume when said position change detecting means detects the position change signal;

said air supply means comprising a supply path selector valve for selecting one of small- or large-diameter supply paths through which the air to be supplied to said air spring chambers passes;

said position control means includes means for controlling said supply path selector valve so as to cause said supply path selector valve to select the large-diameter supply path when said position control means generates a position control signal; and said height control means includes means for controlling said supply path selector valve so as to cause said supply path selector valve to select the small-diameter supply path when siad height control means generates a height control signal.

9. A vehicle suspension apparatus comprising:

air spring chambers arranged between a vehicle body and respective wheels;

air supply means for supplying air to said air spring chambers through supply control valve means;

air exhaust means for exhausting the air from said air spring chambers through exhaust control valve means;

control means for controlling said supply and exhaust control valve means;

said air supply means comprising a high-pressure reserve tank connected to said air spring chambers through said supply control valve means and a first compressor for supplying compressed air to said high-pressure reserve tank;

said air exhaust means comprising a low-pressure reserve tank connected to said air spring chambers through said exhaust control valve means;

said first compressor of said air supply means being provided with a suction port connected to said low-pressure reserve tank;

height detecting means for detecting a height of the vehicle;

height control means for supplying a height control signal to said supply and exhaust control valve means so as to control the vehicle height such that the air is supplied to or exhausted from said air spring chambers on the basis of a height signal detected by said height detecting means;

position change detecting means for detecting a position change in the vehicle body; and position control means for supplying a position control signal to said supply and exhaust control valve means so as to control the position change such that the air is supplied to contracted air spring chambers, among said air spring chambers, along a direction of the position change in a predetermined volume, annd such that the air is exhausted from extended air spring chambers, among said air spring chambers, in a predetermined volume when said position change detecting means detects the position change signal;

said air exhaust means comprising an exhaust path selector valve for selecting one of small- and large-diameter exhaust paths through which the air exhausted from said air spring chambers passes;

said position control means includes means for controlling said exhaust path selector valve so as to cause said exhaust path selector valve to select the large-diameter exhaust path when said position control means generates a position control signal; and said height control means includes means for controlling said exhaust path selector valve so as to cause said exhaust path selector valve to select the small-diameter exhaust path when said height control means generates a height control signal.

10. A vehicle suspension apparatus comprising:

air spring chambers arranged between a vehicle body and respective wheels;

air supply means for supplying air to said air spring chambers through supply control valve means;

air exhaust means for exhausting the air from said air spring chambers through exhaust control valve means;

control means for controlling said supply and exhaust control valve means;

said air supply means comprising a high-pressure reserve tank connected to said air spring chambers through said supply control valve means and a first compressor for supplying compressed air to said high-pressure reserve tank;

said air exhaust means comprising a low-pressure reserve tank connected to said air spring chambers through said exhaust control valve means;

said first compressor of said air supply means being provided with a suction port connected to said low-pressure reserve tank; height detecting means for detecting a height of the vehicle;

height control means for supplying a height control signal to said supply and exhaust control valve means so as to control the vehicle height such that the air is supplied to or exhausted from said air spring chambers on the basis of a height signal detected by said height detecting means;

position change detecting means for detecting a position change in the vehicle body; and position control means for supplying a position control signal to said supply and exhaust control valve means so as to control the position change such that the air is supplied to contracted air spring chambers, among said air spring chambers, along a direction of the positon changer in a predetermined volume, and such that air is exhausted from extended air spring chambers, among said air spring chambers, in a prdetermined volume when said position change detecting means detects the position change signal;

said air supply means comprising a supply path selector valve for selecting one of small- and large-diameter supply paths through which the air to be supplied to said air spring chambers passes;

said air exhaust means comprising an exhaust path selector valve for selecting one of small- and large-diameter exhaust paths through which the air exhausted from said air spring chambers passes;

said position control means including means for controlling said supply path selector valve so as to cause said supply or exhaust path selector valve to select the large-diameter supply or exhaust path when said position control means generates a position control signal; and said height control means includes means for controlling said supply path selector valve so as to cause said supply or exhaust path selector valve to select the small-diameter supply or exhaust path when said height control means generates the height control signal.

11. A vehicle suspension apparatus comprising:
air spring chambers arranged between a vehicle body and respective wheels;
air supply means for supplying air to said air spring chambers through supply control valve means;
air exhaust means for exhausting the air from said air spring chambers through exhaust control valve means;
control means for controlling said supply and exhaust control valve means;
said air supply means comprising a high-pressure reserve tank connected to said air spring chambers through said supply control valve means and a first compressor for supplying compressed air to said high-pressure reserve tank;
said air exhaust means comprising a low-pressure reserve tank connected to said air spring chambers through said exhaust control valve means;
said first compressor of said air supply means being provided with a suction port connected to said low-pressure reserve tank;
a second compressor for supplying atmospheric air to said high-pressure reserve tank through a check valve; and
a drier arranged between said check valve and said second compressor.

12. The apparatus of claim 11, further comprising compressor control means for driving said first compressor when the pressure of said low-pressure reserve tank exceeds a first predetermined pressure, and for driving said second compressor when the pressure of said high-pressure reserve tank is less than a second predetermined pressure.

13. The apparatus of claim 11, further comprising an exhaust valve arranged between said drier and said second compressor for communicating with atmospheric air:
said air exhaust means comprises an exhaust direction selector valve switchable between a first position where the air exhausted from said spring chambers through the exhaust control valves is supplied to said low-pressure reserve tank, and a second position where the air is supplied to said exhaust valve;
said position control means controls said exhaust direction selector valve which is set in the first position, when said position control means generates a position control signal; and
said height control means controls said exhaust direction selector valve which is set in the second position, when said height control means generates a height control signal.

14. The apparatus of claim 13, further comprising a check valve arranged between said exhaust direction selector valve and said low-pressure reserve tank for allowing an air flow in a designated exhaust direction.

15. The apparatus of claim 14, wherein said check valve is opened when a difference between upstream air and downstream air, with respect to said check valve, exceeds a predetermined level.

16. The apparatus of claim 13, further comprising a check valve, arranged substantially midway along a path from said exhaust direction selector valve to the atmosphere through said drier and said exhaust valve, for allowing an air flow only along a designated exhaust direction.

17. The apparatus of claim 13, wherein said check valve is opened when a difference between upstream air and downstream air, with respect to said check valve, exceeds a predetermined level.

* * * * *